(12) United States Patent  (10) Patent No.: US 7,668,437 B1
Yamada et al.  (45) Date of Patent: Feb. 23, 2010

(54) RECORDING APPARATUS, RECORDING METHOD, AND RECORD MEDIUM

(75) Inventors: Makoto Yamada, Tokyo (JP); Satoshi Tsujii, Tokyo (JP); Toshihiro Ishizaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 993 days.

(21) Appl. No.: 09/676,645

(22) Filed: Sep. 29, 2000

(30) Foreign Application Priority Data

Sep. 30, 1999 (JP) ................................. 11-279994
Dec. 15, 1999 (JP) ................................. 11-356037

(51) Int. Cl.
 *H04N 5/91* (2006.01)
(52) U.S. Cl. ......................................... 386/95; 386/112
(58) Field of Classification Search .................. 386/46, 386/95, 98, 111, 112, 125, 126
See application file for complete search history.

(56) References Cited

U.S. PATENT DOCUMENTS

| 5,592,450 | A |   | 1/1997  | Yonemitsu et al. |         |
|-----------|---|---|---------|------------------|---------|
| 6,055,565 | A | * | 4/2000  | Inai             | 709/218 |
| 6,263,152 | B1| * | 7/2001  | Hisatomi et al.  | 386/70  |
| 6,570,837 | B1| * | 5/2003  | Kikuchi et al.   | 369/275.1 |
| 6,813,681 | B1| * | 11/2004 | Kanota et al.    | 711/112 |

FOREIGN PATENT DOCUMENTS

| EP | 0 424 903    |    | 5/1991  |
|----|--------------|----|---------|
| EP | 0 709 843    |    | 5/1996  |
| EP | 0 847 199    |    | 6/1998  |
| EP | 0858171 A2   | *  | 8/1998  |
| EP | 0 905 699    |    | 3/1999  |
| EP | 1 085 768    |    | 3/2001  |
| JP | 09288677 A   | *  | 11/1997 |
| JP | 11-39800     |    | 2/1999  |
| JP | 11-219525    |    | 8/1999  |
| JP | 11250585 A   | *  | 9/1999  |
| WO | WO 97/13361  |    | 4/1997  |
| WO | WO 99/37056  |    | 7/1999  |

* cited by examiner

*Primary Examiner*—Huy T Nguyen
(74) *Attorney, Agent, or Firm*—Frommer Lawrence & Haug LLP; William S. Frommer; Thomas F. Presson

(57) ABSTRACT

A recording apparatus for recording video data to a rewritable optical disc is disclosed, that comprises an encoding means for encoding video data corresponding to a compression-encoding process, a converting means for converting the data structure of the encoded video data received from the encoding means into a file structure that allows a moving picture to be synchronously reproduced by computer software without need to use specially dedicated hardware, and a recording means for recording data having the file structure to an optical disc, wherein the file structure has a first data unit and a second data unit, the second data unit being a set of the first data units, and wherein a plurality of the second data units is matched with a successive record length of which data is written to the optical disc.

16 Claims, 13 Drawing Sheets

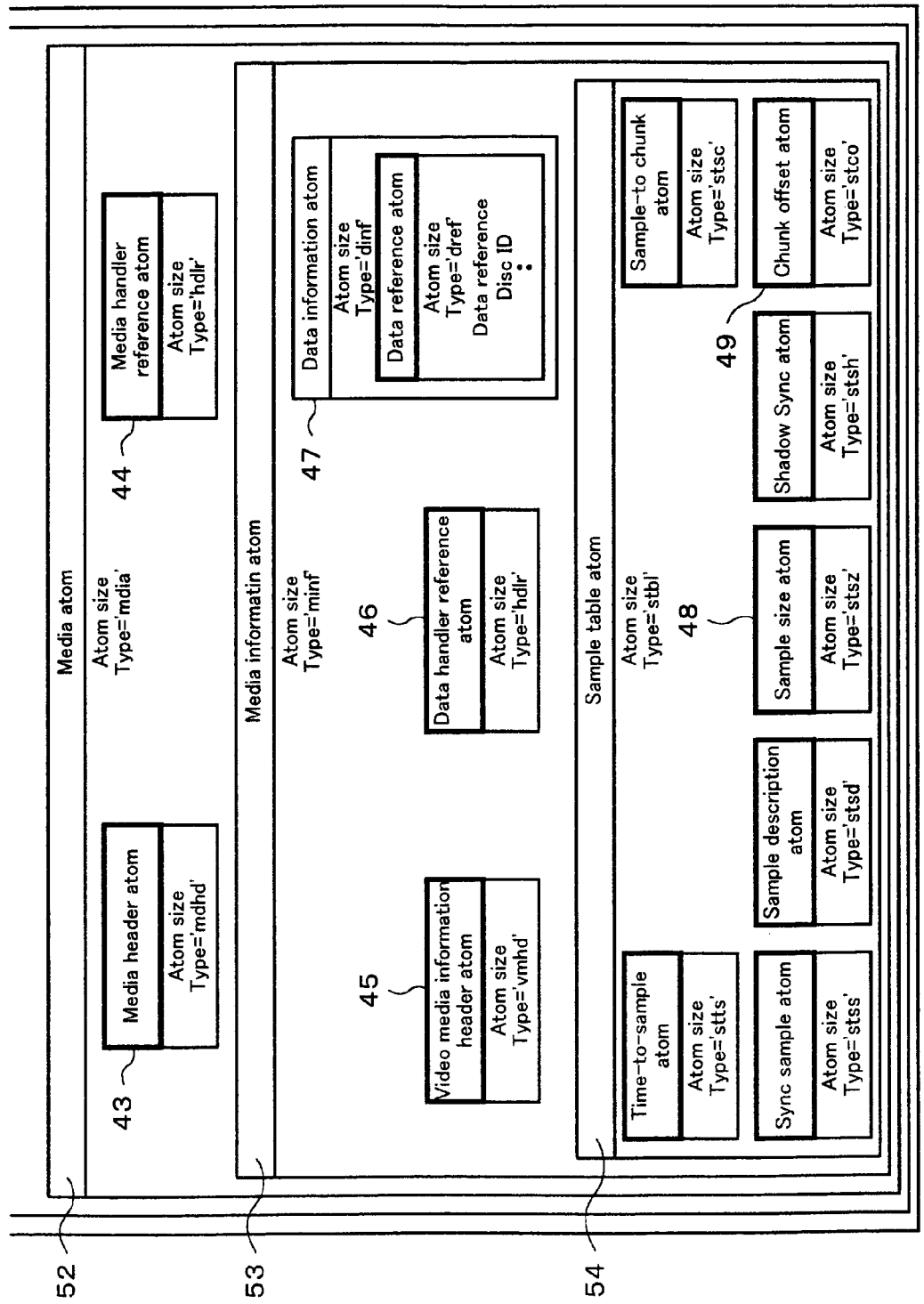

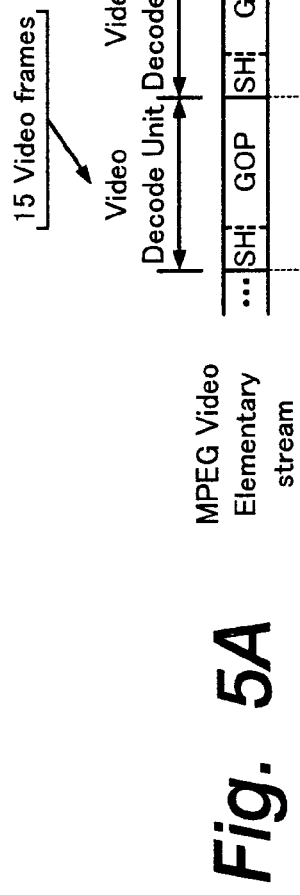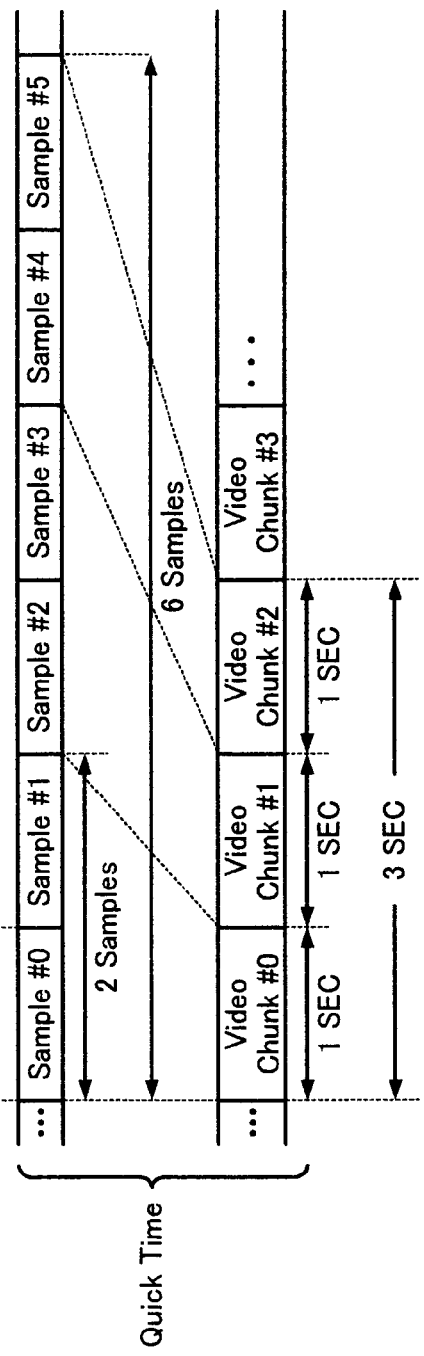
Fig. 5A
Fig. 5B

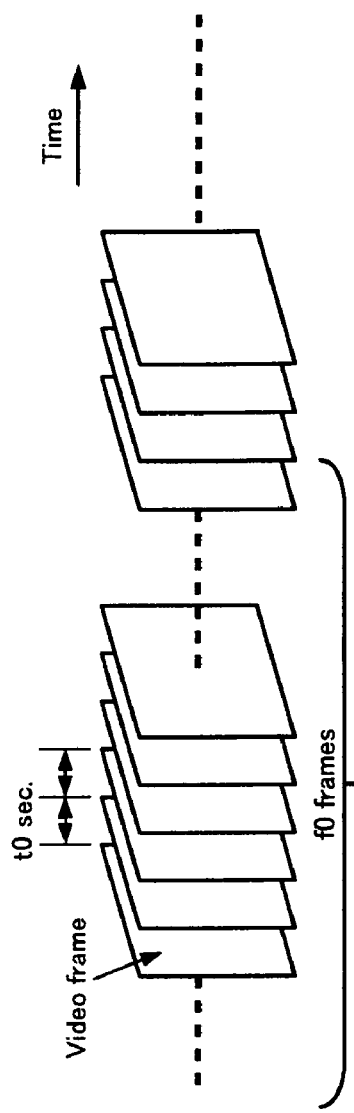
*Fig. 8A*
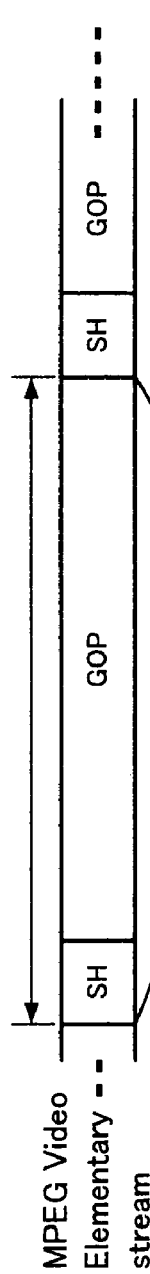
*Fig. 8B*
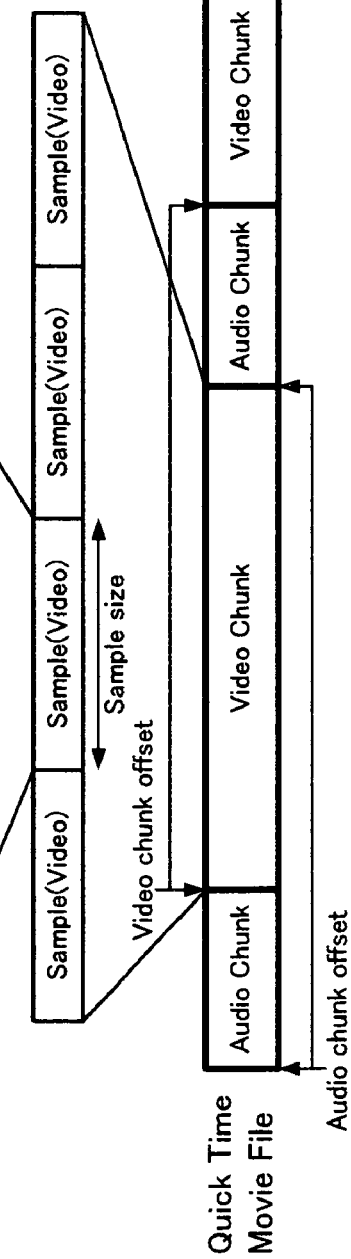
*Fig. 8C*
*Fig. 8D*

Fig. 11

| Atom | Type |
|---|---|
| Movie atom { | 'moov' |
|     Movie header atom | 'mvhd' |
|     Track atom (video) { | 'trak' |
|         Track header atom | 'tkhd' |
|         Edit atom | 'edts' |
|         Media atom { | 'mdia' |
|             Media header atom | 'mdhd' |
|             Media handler reference atom | 'hdlr' |
|             Media information atom { | 'minf' |
|                 Video media information header atom | 'vmhd' |
|                 Data handler reference atom | 'hdlr' |
|                 Data information atom | 'dinf' |
|                 Sample table atom { | 'stbl' |
|                     Sample description atom | 'stsd' |
|                     Time-to-sample atom | 'stts' |
|                     Sample size atom | 'stsz' |
|                     Sample-to-chunk atom | 'stsc' |
|                     Chunk offset atom | 'stco' |
|                     Sync sample atom | 'stss' |
|                 } | |
|             } | |
|         } | |
|     } | |
|     Track atom (audio) { | 'trak' |
|         Track header atom | 'tkhd' |
|         Edit atom | 'edts' |
|         Media atom { | 'mdia' |
|             Media header atom | 'mdhd' |
|             Media handler reference atom | 'hdlr' |
|             Media information atom { | 'minf' |
|                 Sound media information header atom | 'smhd' |
|                 Data handler reference atom | 'hdlr' |
|                 Data information atom | 'dinf' |
|                 Sample table atom { | 'stbl' |
|                     Sample description atom | 'stsd' |
|                     Time-to-sample atom | 'stts' |
|                     Sample size atom | 'stsz' |
|                     Sample-to-chunk atom | 'stsc' |
|                     Chunk offset atom | 'stco' |
|                     Sync sample atom | 'stss' |
|                 } | |
|             } | |
|         } | |
|     } | |
| } | |
| Movie data atom | 'mdat' |

Fig. 12

```
Sample description atom {
    Atom size
    Type
    Version
    Flags
    Number of entries
    Sample description table {
        Sample description size
        Data format = 'DMPG'          ← FORMAT TYPE IS
        Reserved                         NEWLY DEFINED
        Data reference index
        Video sample description or Sound Sample description {
            Version
            Revision level
            Vendor
                ⋮

[Extension size]         (4 byte)      ↑
            [Extension type]='stde'  (4 byte)
            [Flags]                  (1 byte)    FIELS ARE
            [Track ID]               (4 byte)   ADDITIONALLY
            [Data reference index]   (2 byte)     DEFINED
            [Recorded data size]     (2 byte)
            [Repeat number]          (1 byte)      ↓
        }
    }
}
```

RECORDING APPARATUS, RECORDING METHOD, AND RECORD MEDIUM

BACKGROUND OF THE INVENTION

1. Field of the Invention

The present invention relates to a recording apparatus, a recording method, and a record medium having a multimedia data format such as QuickTime.

2. Description of the Related Art

In recent years, as a multi-media system software program, QuickTime is known. The QuickTime is a software program that allows data that varies on time base (this data is referred to as movie) to be handled. A movie contains a moving picture, a voice, and a text. Currently, a QuickTime file format is available as a Macintosh platform of Apple. The QuickTime file format is an MPEG-1 (Moving Picture Experts Group phase 1) program stream file storage format of which a video elementary stream and an audio elementary stream are multiplexed on time base). In the storage format, the entire MPEG-1 file (namely, one whole closed scene) is treated as a sample of the QuickTime file format regardless of the duration thereof. Such a large sample is treated as one large chuck.

In addition, audio data and video data are stored together on one track (or one medium) in the QuickTime file format. As a new medium type that represents such data portions contained in a large sample or a large chunk, MPEG Media has been defined.

The accessibility and editing efficiency of a particular type of data contained in a large sample deteriorate. To allow a computer to reproduce and edit a QuickTime movie file, video data and audio data recorded on a record medium (for example, an optical disc) of the portable recording and reproducing apparatus with built-in camera may be converted into a QuickTime file format. In this case, the accessibility and editing efficiency of a particular type of data should be further improved. This problem applies to an audio data recording and reproducing apparatus as well as such a video data recording and reproducing apparatus.

OBJECTS AND SUMMARY OF THE INVENTION

Therefore, an object of the present invention is to provide a recording apparatus, a recording method, and a record medium that allow the accessibility and editing efficiency to be improved in the case that data having a file structure corresponding to a multimedia data format such as QuickTime is recorded to a record medium.

A first aspect of the present invention is a recording apparatus for recording video data to a rewritable optical disc, comprising an encoding means for encoding video data corresponding to a compression-encoding process, a converting means for converting the data structure of the encoded video data received from the encoding means into a file structure that allows a moving picture to be synchronously reproduced by computer software without need to use specially dedicated hardware, and a recording means for recording data having the file structure to an optical disc, wherein the file structure has a first data unit and a second data unit, the second data unit being a set of the first data units, and wherein a plurality of the second data units is matched with a successive record length of which data is written to the optical disc.

A second aspect of the present invention is a recording apparatus for recording audio data to a rewritable optical disc, comprising a converting means for converting the data structure of audio data or encoded audio data into a file structure that allows a moving picture to be synchronously reproduced by computer software without need to use specially dedicated hardware, and a recording means for recording data having the file structure to an optical disc, wherein the file structure has a first data unit and a second data unit, the second data unit being a set of the first data units, and wherein a plurality of the second data units is matched with a successive record length of which data is written to the optical disc.

A third aspect of the present invention is a recording apparatus for recording video data and audio data to a rewritable optical disc, comprising a video encoding means for encoding video data corresponding to a compression-encoding process in a combination of an inter-frame predictive encoding process and a motion compensating process that allow a plurality of frames are structured as a group, an audio output means for outputting audio data that has been compression-encoded or non-compressed, a multiplexing means for converting the data structure of the encoded video data received from the encoding means and the data structure of the audio data received from the audio output means into respective file structures that allow a moving picture to be synchronously reproduced by computer software without need to use specially dedicated hardware and multiplexing the encoded video data and the audio data, and a recording means for recording the multiplexed data to an optical disc, wherein each of the file structures has a first data unit and a second data unit, the second data unit being a set of the first data units, and wherein a plurality of the second data units is matched with a successive record length of which data is written to the optical disc.

A fourth aspect of the present invention is a recording method for recording video data to a rewritable optical disc, comprising the steps of encoding video data corresponding to a compression-encoding process, converting the data structure of the encoded video data received at the encoding step into a file structure that allows a moving picture to be synchronously reproduced by computer software without need to use specially dedicated hardware, and recording data having the file structure to an optical disc, wherein the file structure has a first data unit and a second data unit, the second data unit being a set of the first data units, and wherein a plurality of the second data units is matched with a successive record length of which data is written to the optical disc.

A fifth aspect of the present invention is a recording method for recording audio data to a rewritable optical disc, comprising the steps of converting the data structure of audio data or encoded audio data into a file structure that allows a moving picture to be synchronously reproduced by computer software without need to use specially dedicated hardware, and recording data having the file structure to an optical disc, wherein the file structure has a first data unit and a second data unit, the second data unit being a set of the first data units, and wherein a plurality of the second data units is matched with a successive record length of which data is written to the optical disc.

A sixth aspect of the present invention is a recording method for recording video data and audio data to a rewritable optical disc, comprising the steps of encoding video data corresponding to a compression-encoding process in a combination of an inter-frame predictive encoding process and a motion compensating process that allow a plurality of frames are structured as a group, outputting audio data that has been compression-encoded or non-compressed, converting the data structure of the encoded video data received at the encoding step and the data structure of the audio data received at the outputting step into respective file structures that allow a moving picture to be synchronously reproduced by computer software without need to use specially dedicated hardware and multiplexing the encoded video data and the audio data, and recording the multiplexed data to an optical disc, wherein each of the file structures has a first data unit and a second data unit, the second data unit being a set of the first data units, and wherein a plurality of the second data units is matched with a successive record length of which data is written to the optical disc.

A seventh aspect of the present invention is a record medium on which a program for recording video data to a record medium has been recorded, the program causing a computer to perform the steps of encoding video data corresponding to a compression-encoding process, converting the data structure of the encoded video data received at the encoding step into a file structure that allows a moving picture to be synchronously reproduced by computer software without need to use specially dedicated hardware, and recording data having the file structure to an optical disc, wherein the file structure has a first data unit and a second data unit, the second data unit being a set of the first data units, and wherein a plurality of the second data units is matched with a successive record length of which data is written to the optical disc.

An eighth aspect of the present invention is a record medium on which a program for recording audio data to a record medium has been recorded, the program causing a computer to perform the steps of converting the data structure of audio data or encoded audio data into a file structure that allows a moving picture to be synchronously reproduced by computer software without need to use specially dedicated hardware, and recording data having the file structure to an optical disc, wherein the file structure has a first data unit and a second data unit, the second data unit being a set of the first data units, and wherein a plurality of the second data units is matched with a successive record length of which data is written to the optical disc.

A ninth aspect of the present invention is a record medium on which a program for recording video data and audio data to a record medium has been recorded, the program causing a computer to perform the steps of encoding video data corresponding to a compression-encoding process in a combination of an inter-frame predictive encoding process and a motion compensating process that allow a plurality of frames are structured as a group, outputting audio data that has been compression-encoded or non-compressed, converting the data structure of the encoded video data received at the encoding step and the data structure of the audio data received at the outputting step into respective file structures that allow a moving picture to be synchronously reproduced by computer software without need to use specially dedicated hardware and multiplexing the encoded video data and the audio data, and recording the multiplexed data to an optical disc, wherein each of the file structures has a first data unit and a second data unit, the second data unit being a set of the first data units, and wherein a plurality of the second data units is matched with a successive record length of which data is written to the optical disc.

When data having a file structure is recorded to an optical disc, since the successive record length is matched with a second data unit (for example, a chunk of QuickTime), the accessibility and editing efficiency can be improved. In addition, since a plurality of sets of encoded video data and audio data (compressed or non-compressed) are matched with the successive record length, the accessibility and editing efficiency can be improved.

The following US patents are prior patent of the present invention.
(1) U.S. Pat. No. 4,945,475
(2) U.S. Pat. No. 5,253,053
(3) U.S. Pat. No. 5,652,879

In addition, the applicant of the present invention has filed the following Japanese patent applications.
(1) Japanese Patent Application No. 11-264630 filed on Sep. 17, 1999
(2) Japanese Patent Application No. 11-264631 filed on Sep. 17, 1999
(3) Japanese Patent Application No. 11-279993 filed on Sep. 30, 1999

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 4 is a schematic diagram showing the detailed data structure of the movie resource of QuickTime;

FIGS. 5A and 5B are schematic diagrams for explaining the relation between GOPs of the MPEG video and a QuickTime file format according to the embodiment of the present invention;

FIGS. 8A, 8B, 8C, and 8D are schematic diagrams for explaining the relation between GOPs of MPEG video data and a QuickTime file format according to the embodiment of the present invention;

FIG. 11 is a schematic diagram showing a general data structure of a QuickTime movie file composed of two tracks of a video track and an audio track;

FIG. 12 is a schematic diagram showing the detailed data structure of a sample description according to the embodiment of the present invention.

DETAILED DESCRIPTION OF THE PREFERRED EMBODIMENTS

Figure 1:
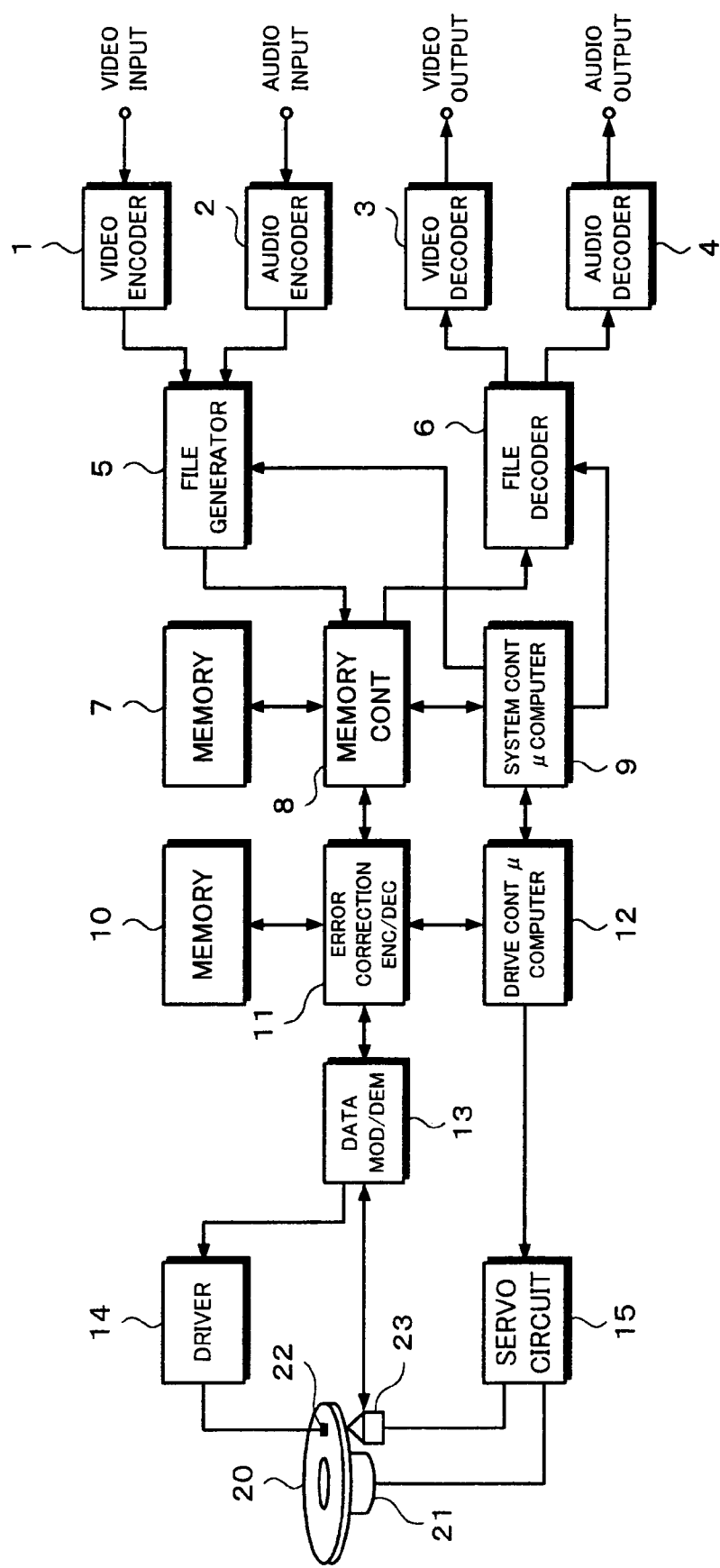
FIG. 1 is a block diagram showing the structure of an embodiment of the present invention.

Hereinafter, an embodiment of the invention will now be described with reference to the drawings. FIG. 1 shows an example of the structure of a digital recording and reproducing apparatus according to the embodiment of the present invention. In FIG. 1, 1 denotes digital encoder. A video input is supplied to video encoder 1. The video encoder 1 compression-encodes the video signal. Thus, 2 denotes audio encoder. As audio inputs of audio encoder 2, an audio signal is compression-encoded. For example, MPEG is used for the compression-encoding process toward video signals and audio signals. The outputs of video encoder 1 and audio encoder 2 are referred as the element streams.

When MPEG is used, the video encoder 1 is composed of a motion predicting portion, a picture sequence rearranging portion, a subtracting portion, a DCT portion, a quantizing portion, a variable length code encoding portion, and a buffer memory. The motion predicting portion detects a moving vector. The subtracting portion forms a predictive error between an input picture signal and a locally decoded picture signal. The DCT portion transforms an output signal of the subtracting portion corresponding to the DCT method. The quantizing portion quantizes an output signal of the DCT portion. The variable length encoding portion encodes an output signal of the quantizing portion into a signal having a variable length. The buffer memory outputs the encoded data at a constant data rate. The picture sequence rearranging portion rearranges the sequence of pictures corresponding to the encoding process. In other words, the picture sequence rearranging portion rearranges the sequence of pictures so that after I and P pictures are encoded, a B picture is encoded. The local decoding portion is composed of an inverse quantizing portion, an inverse DCT portion, an adding portion, a frame memory, and a motion compensating portion. The motion compensating portion performs all of a forward predicting operation, a reverse predicting operation, and a bidirectional predicting operation. When the intra encoding process is performed, the subtracting portion directly passes data, not performs the subtracting process. The audio encoder 2 comprises a sub-band encoding portion and an adaptively quantized bit allocating portion.

As an example, in the case of a portable disc recording and reproducing apparatus with a built-in camera, a picture photographed by the camera is input as video data. In addition, a voice collected by a microphone is input as audio data. The video encoder 1 and the audio encoder 2 convert analog signals into digital signals. According to the embodiment of the present invention, a rewritable optical disc is used as a record medium. Examples of such an optical disc are a magneto-optical disc and a phase-change type disc. According to the embodiment of the present invention, a magneto-optical disc having a relatively small diameter is used.

Output signals of the video encoder 1 and the audio encoder 2 are supplied to a file generator 5. The file generator 5 converts output signals of the video encoder 1 and the audio encoder 2 into a video elementary stream and an audio elementary stream so that they can be handled corresponding to a computer software program for synchronously reproducing a moving picture and a sound without need to use a dedicated hardware portion. According to the embodiment of the present invention, for example, as such a software program, QuickTime is used. A sequence of data (video data, audio data, and text data) that varies on time base and that is process by QuickTime is referred to as QuickTime movie. The file generator 5 multiplexes encoded video data and encoded audio data. To generate a QuickTime movie file, a system controlling microcomputer 9 controls the file generator 5.

QuickTime movie files generated by the file generator 5 are successively written to a memory 7 through a memory controller 8. When the system controlling microcomputer 9 issues a data write request for a disc to the memory controller 8, the memory controller 8 reads a QuickTime movie file from the memory 7. In this example, the transfer rate of the encoding process for a QuickTime movie file is lower than that for data written to the disc. For example, the former is half of the latter. Thus, although QuickTime movie files are successively written to the memory 7, they are intermittently read from the memory 7 under the control of the system controlling microcomputer 9 in such a manner that the memory 7 is prevented from overflowing or underflowing.

A QuickTime movie file that is read from the memory 7 through the memory controller 8 is supplied to an error correction encoder/decoder 11. The error correction encoder/decoder 11 temporarily writes a QuickTime movie file to a memory 10. The error correction encoder/decoder 11 performs an interleaving process and an error correction code encoding process so as to generate redundant data. The error correction encoder/decoder 11 reads the QuickTime movie file with redundant data from the memory 10.

Output data of the error correction encoder/decoder 11 is supplied to a data modulator/demodulator 13. When digital data is recorded on the disc, the data modulator/demodulator 13 modulates the data in such a manner that a clock signal can be easily extracted so that data can be recorded on a disc free from a problem such as an inter-code interference. For example, RLL (1, 7) can be used.

An output signal of the data modulator/demodulator 13 is supplied to a magnetic field modulating driver 14. In addition, a signal for driving an optical pickup 23 is output to the magnetic field modulating driver 14. The magnetic field modulating driver 14 drives a magnetic field head 22 corresponding to the input signal so as to apply a magnetic field to an optical disc 20. The optical pickup 23 radiates a recording laser beam to the optical disc 20. In such a manner, data is recorded on the optical disc 20. The optical disc 20 is rotated at CLV (Constant Linear Velocity), CAV (Constant Angular Velocity), or ZCAV (Zone CLV of which the disc surface area is divided into for example three areas in each of =which the optical disc 20 is rotated at CAV in such a manner that the velocity of the innermost area is the highest and the velocity of the outermost area is the lowest).

Since data that is intermittently read from the memory controller 8 is recorded to the optical disc 20, data is not successively recorded. In other words, after a predetermined amount of data is recorded, the recording operation is stopped until the next record request is received.

When the system controlling microcomputer 9 issues a request to a drive controlling microcomputer 12, it issues a request to a servo circuit 15 so as to control the entire disc drive. Thus, the disc drive performs a recording operation. The servo circuit 15 performs a disc radial moving servo operation, a tracking servo operation, and a focus servo operation for the optical pickup 23. In addition, the servo circuit 15 performs a spindle servo operation for a motor 21. In association with the system controlling microcomputer 9, a user operation input portion (not shown) is disposed.

Next, the structure and operation of the reproducing portion will be described. When data is reproduced, a reproducing laser beam is radiated to the optical disc 20. A detector of the optical pickup 23 converts the reflected light of the optical disc 20 into a reproduction signal. A tracking error and a focus error are detected from an output signal of the detector of the optical pickup 23. The servo circuit 15 controls the optical pickup 23 so that the optical pickup 23 is placed and focused on a desired track. In addition, the servo circuit 15 controls the radial movement of the optical pickup 23 so that it reproduces data on a desired track of the optical disc 20.

As with the recording operation, when data is reproduced, the transfer rate of data reproduced from the optical disc 20 is higher than that of a QuickTime movie file. For example, the transfer rate of data reproduced form the optical disc 20 is twice as large as the transfer rate of a QuickTime movie file. Likewise, data is not successively reproduced from the optical disc 20. In other words, an intermittent reproducing operation is performed in such a manner that after a predetermined amount of data is reproduced, the reproducing operation is stopped until the next reproducing request is received. As with the recording operation, in the reproducing operation, when the system controlling microcomputer 9 issues a request to the drive controlling microcomputer 12, it issues a request to the servo circuit 15 so as to control the entire disc drive.

The reproduction signal that is output from the optical pickup 23 is input to the data modulator/demodulator 13. The data modulator/demodulator 13 demodulates the reproduction signal. The demodulated data is supplied to the error correction encoder/decoder 11. The error correction encoder/decoder 11 temporarily writes the reproduction data to the memory 10. The error correction encoder/decoder 11 performs a deinterleaving process and an error correcting process for the reproduction data. The error-corrected QuickTime movie file is written to the memory 7 through the memory controller 8.

A QuickTime movie file written to the memory 7 is output to a file decoder 6 in synchronization with a demultiplexing timing corresponding to a request issued by the system controlling microcomputer 9. The system controlling microcomputer 9 supervises the amount of data that is reproduced from the optical disc 20 and written to the memory 7 and the amount of data that is read from the memory 7 and output to the file decoder 6 so as to successively reproduce the video signal and the audio signal. In addition, the system controlling microcomputer 9 controls the memory controller 8 and the drive controlling microcomputer 12 so as to read data from the optical disc 20 in such a manner that the memory 7 does not overflow or underflow.

The file decoder 6 decodes a QuickTime movie file into a video elementary stream and an audio elementary stream under the control of the system controlling microcomputer 9. The video elementary stream is supplied to a video decoder 3. The audio elementary stream is supplied to an audio decoder 4. The video elementary stream and the audio elementary stream are synchronously output from the file decoder 6.

The video decoder 3 and the audio decoder 4 compression-decode the video elementary stream and the audio elementary stream and generate a video output signal and an audio output signal, respectively. In this example, the video signal and the audio signal have been encoded corresponding to MPEG. A video output signal is output to a display (liquid crystal display or the like) through a display driver and displayed as a picture. Likewise, an audio output signal is output to a speaker through an audio amplifier and reproduced as a sound (these structural portions are not shown).

The video decoder 3 is composed of a buffer memory, a variable length code decoding portion, an inverse DCT portion, an inverse quantizing portion, an adding portion, and a local decoding portion. The adding portion adds an output signal of the inverse quantizing portion and a local decoded output signal. The local decoding portion is composed of a picture sequence rearranging portion, a frame memory, and a motion compensating portion. When an intra encoding process is performed, the adding portion directly passes data, not performs the adding process. Decoded data is output from the adding portion to the picture sequence rearranging portion. The picture sequence rearranging portion rearranges the decoded pictures in the original order.

As was described above, since the optical disc 20 on which data is recorded is attachable and detachable, the data recorded on the optical disc 20 can be reproduced by another apparatus. For example, a personal computer that operates with QuickTime application software may read data recorded on the optical disc 20 and reproduce video data and audio data therefrom. It should be noted that the present invention can be applied to an apparatus that handles only video data or only audio data.

Next, the embodiment of the present invention will be described in more detail. First of all, with reference to FIG. 2, QuickTime will be described in brief. QuickTime is an OS expansion function for reproducing a moving picture without need to use dedicated hardware. There are various data formats for QuickTime. In other words, audio data, video data, MDI, and so forth of up to 32 tracks can be synchronously output.

A QuickTime movie file is roughly divided into two portions that are a movie resource portion and a movie data portion. The movie resource portion contains time data that represents the duration of the QuickTime movie file and information necessary for referencing real data. On the other hand, the movie data portion contains real video data and real audio data.

One QuickTime movie file can contain different types of medium data such as a sound, a video, and a text as independent tracks that are a sound track, a video track, and a text track, respectively. These independent tracks are strictly controlled on time base. Each track has a medium for referencing the compression method of the real data and the display time period thereof. The medium contains the minimum sample size of the real data in the movie data portion, the position of a chunk that is a block of a plurality of samples, and the display duration of each sample.

Figure 2:
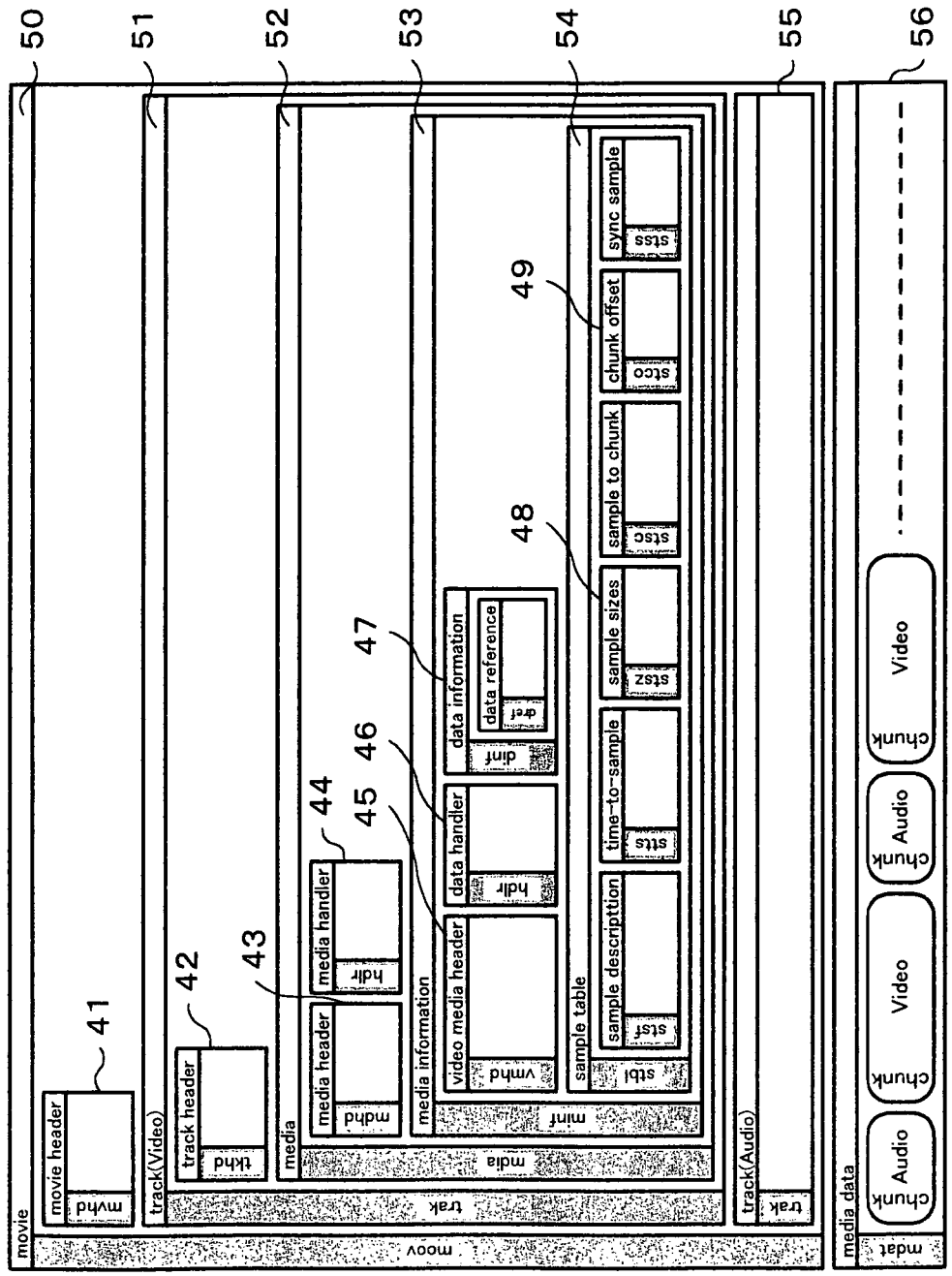
FIG. 2 is a schematic diagram showing an example of a QuickTime file format according to the present invention.

FIG. 2 shows an example of a QuickTime file that handles audio data and video data. The largest structural portions of the QuickTime file are a movie resource portion and a movie data portion. The movie resource portion contains the duration necessary for reproducing the file and data necessary for referencing the real data. The movie data portion contains real data of video data, audio data, and so forth.

Next, the structure of the movie resource portion will be described in detail. A QuickTime movie file has a hierarchical structure of a movie resource portion 50, a track portion 51, a media portion 52, a median formation portion 53, and a sample table portion 54. The track portion 51 describes information about each part of the movie data. The media portion 52 describes information of each part of data. The movie resource portion 50 is used for one video track. Likewise, one QuickTime movie file contains a resource portion 55 for an audio track. The structure of the resource portion 55 is the same as the structure of the movie resource portion 50.

The movie resource portion 50 contains a movie header 41 that describes general information about the file. The track portion 51 contains a track header 42 that describes general information about the track. The media portion 52 contains a media header 43 and a media handler 44. The media header 43 describes general information about the media. The media handler 44 describes information for handling the media data. The media information portion 53 contains a media header 45, a data handler 46, and data information portion 47. The media header 45 describes information about the picture media. The data handler 46 describes information for handling the picture data. The data information portion 47 describes information about the data. The sample table portion 54 contains a sample description 57, a time-to-sample, a sample size 48, a sample-to-chunk, a chunk offset 49, a sync sample, and so forth. The sample description 57 describes each sample. The time-to-sample describes the relation between samples and time base. The sample size 48 describes the size of the sample. The sample-to-chunk describes the relation between samples and chunks. The chunk offset 49 describes the start byte position of the chunk in the movie file. The sync sample describes information about synchronization.

On the other hand, the movie data portion 56 contains audio data encoded corresponding to for example MPEG audio layer 2 and vide data encoded in the compression-encoding method corresponding to for example MPEG (Moving Picture Expert Group) method in the unit of chunks each of which is composed of a predetermined number of samples. However, it should be noted that the present invention is not limited to such an encoding method. In addition, the moving data portion 56 may contain linear data that has not been compression-encoded.

Each track of the movie resource portion is correlated with data contained in the movie data portion. In other words, in the example shown in FIG. 2, since audio data and video data are handled, the movie resource portion contains a video track and an audio track. The movie data portion contains real audio data and real video data. When other types of data are handled, the movie resource portion contains their tracks and the movie data portion contains real data thereof. For example, when a text and MIDI are handled, the movie resource portion contains tracks of the text and the MIDI and the movie data portion contains real data thereof.

Figure 3:
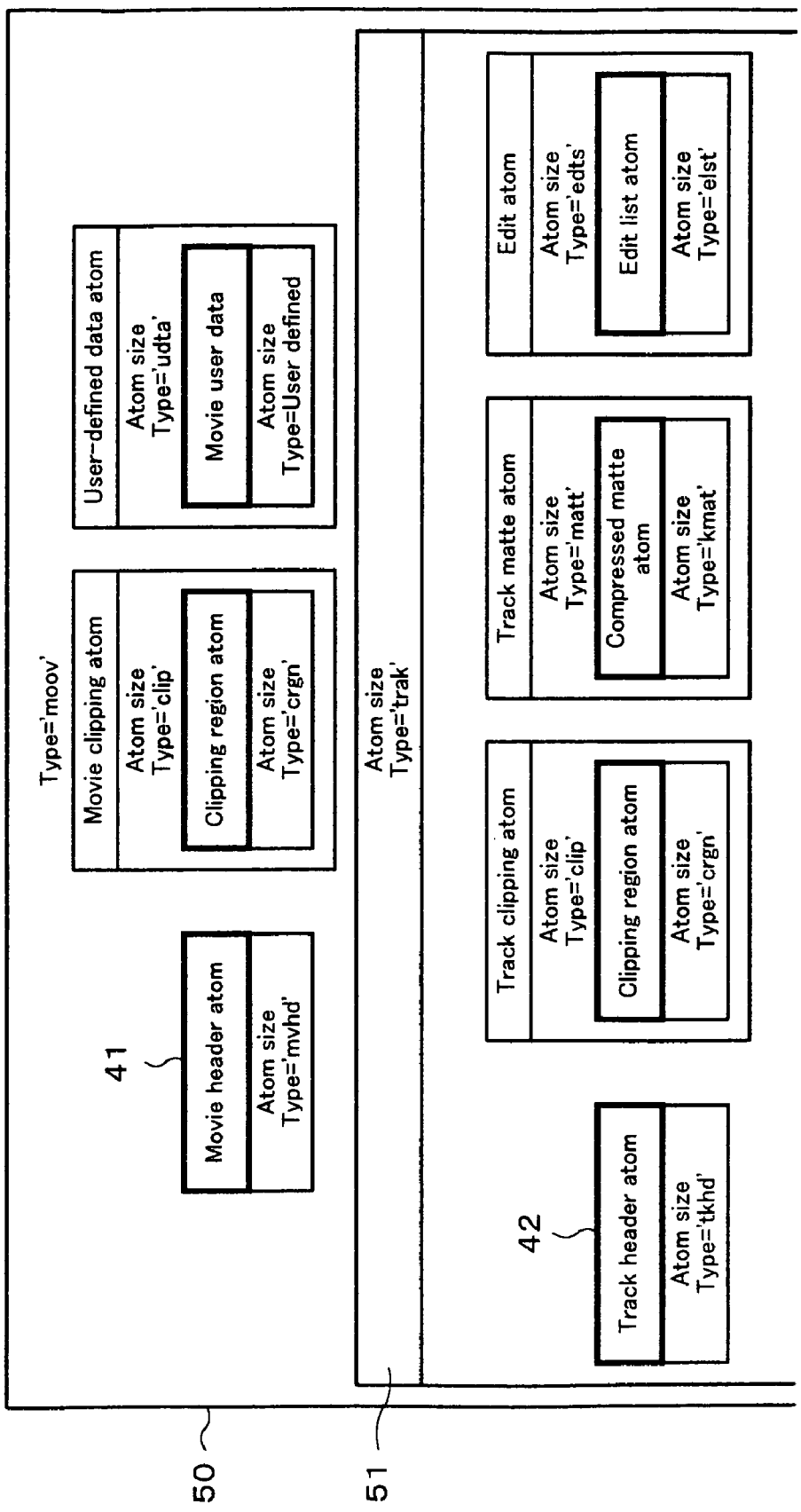
FIG. 3 is a schematic diagram showing the detailed data structure of a movie resource of QuickTime.

FIGS. 3 and 4 show a first portion and a second portion of the detailed data structure of the movie resource portion of the QuickTime movie file, respectively. As was described with reference to FIG. 2, the movie resource portion 50 has a hierarchical structure of the track portion 51, the media portion 52, media information portion 53, and the sample table portion 54. The track portion 51 describes information about individual data parts of the movie data. The media portion 52 describes information about individual data parts. As was described above, the movie resource portion is used for one video track. Likewise, the audio resource portion 55 (not shown) is used for one audio track. The structure of the movie resource portion 50 is the same as the structure of the audio resource portion 55.

Next, a method for converting compressed video data (video elementary stream) and compressed audio data (audio elementary stream) into a QuickTime file format in the case that MPEG2 is used as a decoding method for data that has been compression-encoded will be described. First of all, MPEG will be described. MPEG has a hierarchical structure of six layers that are a sequence layer, a GOP layer, a picture layer, a slice layer, a macro block layer, and a block layer in the order of the highest hierarchical level. A header is placed at the beginning of each of the six layers. For example, a sequence header is a header placed at the beginning of the sequence layer. The sequence header contains a sequence start code, a horizontal screen size, a vertical screen size, an aspect ratio, a picture rate, a bit rate, a VBV buffer size, a restriction parameter bit, a load flag of two quantized matrixes, and a content.

According to MPEG, there are three picture types I, P, and B. In an I picture (Intra-coded picture), when a picture signal is encoded, information of only one picture is used. Thus, when an encoded picture signal is decoded, information of only the I picture is used. In a P picture (Predictive-coded picture), as a predictive picture (a reference picture for obtaining a difference with the current P picture), an I picture or another P picture that has been decoded is temporally followed by the current P picture. The difference between the current P picture and a motion-compensated predictive picture is encoded for each macro block. Alternatively, the current P picture is encoded for each macro block without obtaining the difference of such pictures. One of those methods is selected whichever higher efficiency is obtained. In a B picture (Bidirectionally predictive-coded picture), as predictive pictures (reference pictures for obtaining a difference with the current B picture), three types of reference pictures are used. The first type reference picture is an I picture or a P picture that has been decoded and that is temporally followed by the current B picture. The second type reference picture is an I picture or a P picture that has been decoded and that is temporally preceded by the current B picture. The third type reference picture is an interpolated picture of the first type reference picture and the second type reference picture. The difference between the current B picture and each of the three type reference pictures that have been motion-compensated is encoded for each macro block. Alternatively, the current B picture is encoded for each macro block without obtaining such a difference. One of those methods is selected whichever higher efficiency is obtained.

Thus, there are a frame intra-coded macro block, a forward inter-frame predictive macro frame (a future macro block is predicted with a past macro block), a backward inter-frame predictive macro block (a past macro block is predicted with a future macro block), and a bidirectional macro block (a current macro block is predicted with both a future macro block and a past macro block). All macro blocks in an I picture are intra-frame coded macro blocks. A P picture contains intra-frame coded macro blocks and forward inter-frame predictive macro blocks. A B picture contains the above-described four types of macro blocks.

In MPEG, a GOP (Group Of Pictures) structure that is a group of pictures is defined so that data can be random-accessed. In MPEG, a GOP is defined as follows. The first picture of one GOP is an I picture. The last picture of one GOP is an I picture or a P picture. A GOP that is predicted with the last I or P picture of the preceding GOP is permitted. A GOP that can be decoded without a picture of the preceding GOP is referred to as closed GOP. According to the embodiment, as a structure of a closed GOP, each GOP can be edited.

In MPEG audio (compressing method), three modes of layer 1, layer 2, and layer 3 have been defined. In layer 1, for example 32 sub-band encoding operation and adaptive bit allocating operation are performed. One audio decoding unit is composed of 384 samples. One audio decoding unit is one audio frame of an audio bit stream. The audio decoding unit is the minimum unit of which encoded data is decoded to audio data. Likewise, the video decoding unit corresponding to one video frame has been defined. In NTSC system, one video frame is equivalent to 1/30 seconds. Normally, the bit rate of stereo audio in layer 1 is 256 kbps. In layer 2, a 32 sub-band encoding operation and an adaptive bit allocating operation are performed. One audio decoding unit is composed of 1152 samples. Normally, the bit rate of stereo audio in layer 2 is 192 kbps.

The file generator 5 converts video data and audio data that have been compressed corresponding to MPEG into a file structure corresponding to the above-described QuickTime file format. FIGS. 3A and 3B show the relation among video frames, GOPs, and units of samples and chunks of the Quick-Time file format. As was described above, one sample is the minimum unit of movie data. One chunk is a unit of which a plurality of samples are collected as a block.

As shown in FIG. 5A, for example 15 video frames of an original video signal are compression-encoded corresponding to MPEG2 and thereby one GOP is generated. 15 video frames are equivalent to 0.5 seconds. Each GOP is preferably structured as a closed GOP. A sequence header (SH) is placed at the beginning of each GOP. The sequence header and one GOP compose one video decoding unit. Since a sequence header is placed to each GOP, each sample can be directly edited and decoded with QuickTime. The video encoder 1 shown in FIG. 1 outputs an MPEG video elementary stream shown in FIG. 5A.

As shown in FIG. 5B, one video decoding unit is treated as one sample of the QuickTime file format. Two chronologically successive samples (for example, sample #0 and sample #1) are treated as one video chunk (for example, chunk #0). The duration of one chunk is 3 seconds. Alternatively, six GOPs may be treated as one sample, whereas one video chunk may be treated as one sample. In this case, the duration of one video chunk is 3 seconds.

Figures 6A, 6B:
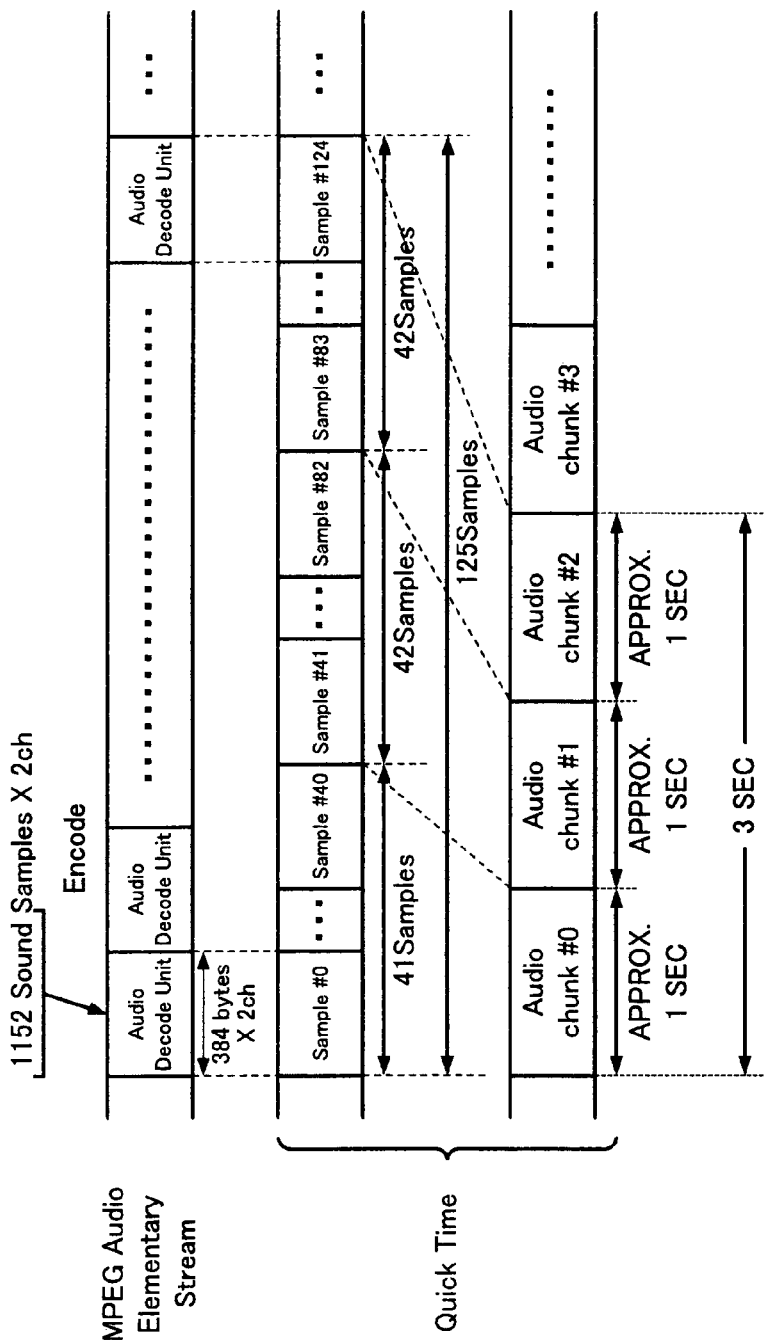
FIGS. 6A and 6B are schematic diagrams for explaining an example of the relation between compression-encoded audio data and a QuickTime file format according to the embodiment of the present invention.

FIG. 6A and 6B show the relation among audio frames encoded corresponding to MPEG audio layer 2 (256 kbps in two-channel stereo), an audio decoding unit, GOPs, and units of samples and chunks in the QuickTime file format. In layer 2, 1152 audio samples/channel are treated as one audio frame. As shown in FIG. 6A, in stereo, audio data of 1152 samples×2 channels is encoded in layer 2 and treated as one audio decoding unit. One audio decoding unit contains data of 384 bytes×2 channels that have been compression-encoded. The audio decoding unit contains a header and information necessary for decoding the encoded data (allocation, scale factor, and so forth).

As shown in FIG. 6B, one audio decoding unit is treated as one sample of the QuickTime file format. Thus, each audio sample can be decoded with QuickTime. 41 chronological successive samples (for example, sample #0 to sample #40) are treated as one audio chunk (for example, chunk #0). 42 chronological successive samples (for example, sample #41 to sample #82) are treated as one audio chunk (for example, chunk #1). 42 chronological successive samples (for example, sample #83 to sample #124) are treated as one audio chunk (for example, chunk #2). When the audio sampling frequency is 48 kHz, the duration of one audio chunk is around 1 second. Thus, the duration of three successive audio chunks is three seconds.

In FIGS. 5A, 5B, 6A, and 6B, the structure of video data and the structure of audio data are separately shown. The file generator 5 multiplexes video data and audio data as one data stream (this process is also referred to as interleaving) and thereby generates a QuickTime movie file. In the QuickTime movie file, video chunks and audio chunks are alternatively placed in the data. In this case, video chunks and audio chunks are placed in such a manner that a video chunk synchronizes with an audio chunk corresponding thereto (for example, the video chunk #0 shown in FIG. 5B and the audio chunk #0 shown in FIG. 6B). As was described above, the duration of video data of one video chunk is equal to the duration of audio data of one audio chunk (for example, one second). The duration of one audio chunk is not exactly one second. However, the duration of three video chunks is equal to the duration of three audio chunks (three seconds).

As another example of the audio compression-encoding method, ATRAC (Adaptive Transform Acoustic Coding) used for Mini Disc may be used. In ATRAC, audio data of 16 bits sampled at 44.1 kHz is processed. The minimum data unit processed in ATRACK is one sound unit. In stereo, one sound unit is composed of 512 samples×16 bits×2 channels.

Figure 7A:
FIGS. 7A and 7B are schematic diagrams for explaining another example of the relation between compression-encoded audio data and a QuickTime file format according to the embodiment of the present invention.
Figure 7B:
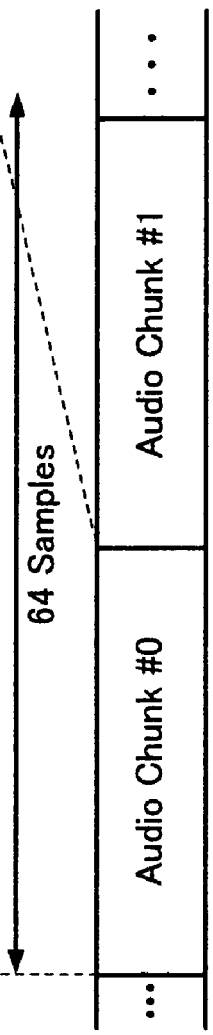

When ATRAC is used as an audio compression-encoding method, as shown in FIG. 7A, one sound unit is compressed to an audio decoding unit of 212 bytes×2 channels. As shown in FIG. 7B, one audio decoding unit is treated as one sample in the QuickTime file format. 64 samples are treated as one chunk in the QuickTime file format.

In addition, MPEG audio layer 3, ATRAC 3 which is an increased compression rate and or the like can be used as an audio compression-encoding method. According to the present invention, the audio data may be recorded on a non-compression basis. The non-compression method is referred to as linear PCM. Likewise, in linear PCM, 512 audio samples are treated as one audio decoding unit. One audio decoding unit is treated as one sample in the QuickTime file format.

FIG. 8 shows a QuickTime file format for video data in the case that video data and audio data are multiplexed. As shown in FIG. 8A, the period of a video frame is t0 seconds and the number of frames of one GOP is f0. When original video data is encoded corresponding to MPEG2, an MPEG video elementary stream shown in FIG. 8B is formed. As was described above, a sequence header (SH) is placed to each GOP.

As shown in FIG. 8C, one GOP with a sequence header is treated as one sample in the QuickTime file format. The length of one sample is referred to as sample size. With a plurality of samples (for example, six samples), one chunk is composed in the QuickTime file format. As shown in FIG. 8D, video chunks and audio chunks are alternately placed on time base and thereby multiplexed. As a result, a QuickTime movie file is formed. The beginning of each video chunk of the QuickTime movie file is referred to as video chunk offset. The video chunk offset is represented by the number of bytes from the beginning of the file to the beginning of the video chunk.

Figures 9A, 9B, 9C, 9D:
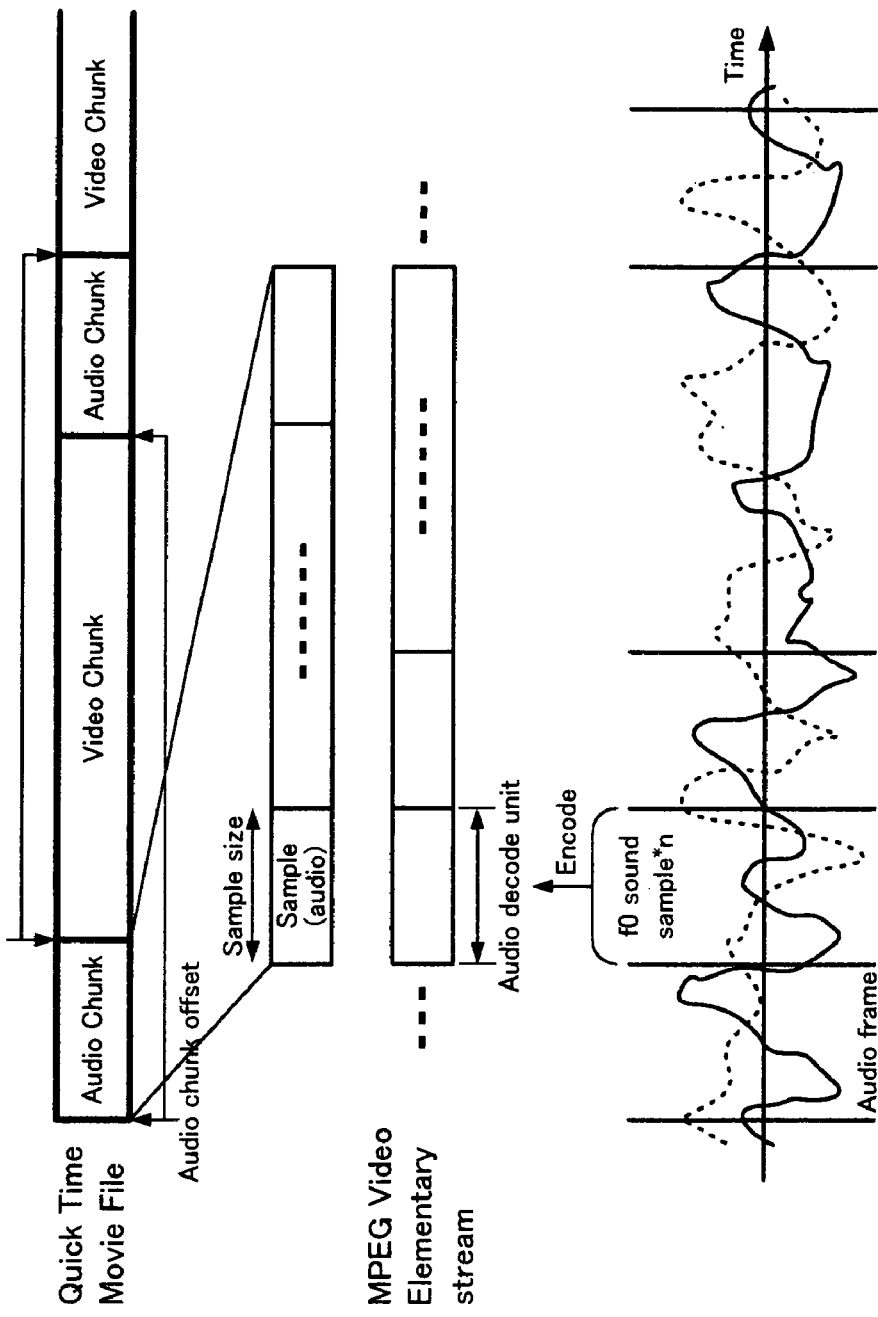
FIGS. 9A, 9B, 9C, and 9D are schematic diagrams for explaining another example of the relation between compression-encoded audio data and a QuickTime file format according to the embodiment of the present invention.

FIG. 9 shows a QuickTime file format of audio data in the case that video data and audio data are multiplexed. As shown in FIG. 9A, an original audio signal is digitized. One audio frame contains f0 audio samples×n channels. When the original audio data is compression-encoded corresponding to MPEG audio, an MPEG audio elementary stream shown in FIG. 9B is formed.

As shown in FIG. 9C, for example one audio decoding unit is treated as one sample of the QuickTime file format. The size of one sample is referred to as sample size. A plurality of samples (for example, 125 samples) composes one chunk of the QuickTime file format. As shown in FIG. 9D, video chunks and audio chunks are alternately placed and thereby multiplexed. As a result, a QuickTime movie file is formed. The beginning of each audio chunk of a QuickTime movie file is referred to as audio chunk offset. The audio chunk offset is represented by the number of bytes from the beginning of the file to the beginning of the audio chunk. The duration of each video chunk is the same as the duration of each audio chunk. For example, the duration is 1 or 3 seconds.

The sample size of a video sample, the sample size of an audio sample, the offset value of a video chunk, and the offset value of an audio chunk are contained in the resource of a QuickTime movie file. With the resource, each sample of each chunk can be designated and edited (in the encoding unit).

Next, as mentioned above, a recording method for recording a QuickTime movie file of which video chunks and audio chunks have been multiplexed (interleaved) to the optical disc 20 will be described. As described above, one QuickTime file format is roughly divided into two major portions that are a movie resource portion and a movie data portion. When a QuickTime movie file is recorded to the optical disc 20, as shown in FIG. 8, the movie resource is matched with the successive record length. In addition, each chunk (video chunk or audio chunk) of the movie data (real data) is matched with the successive record length of the disc. The successive record length means the length of which data can be written to successive addresses without a jumping operation of the optical pickup 23.

Figure 10:
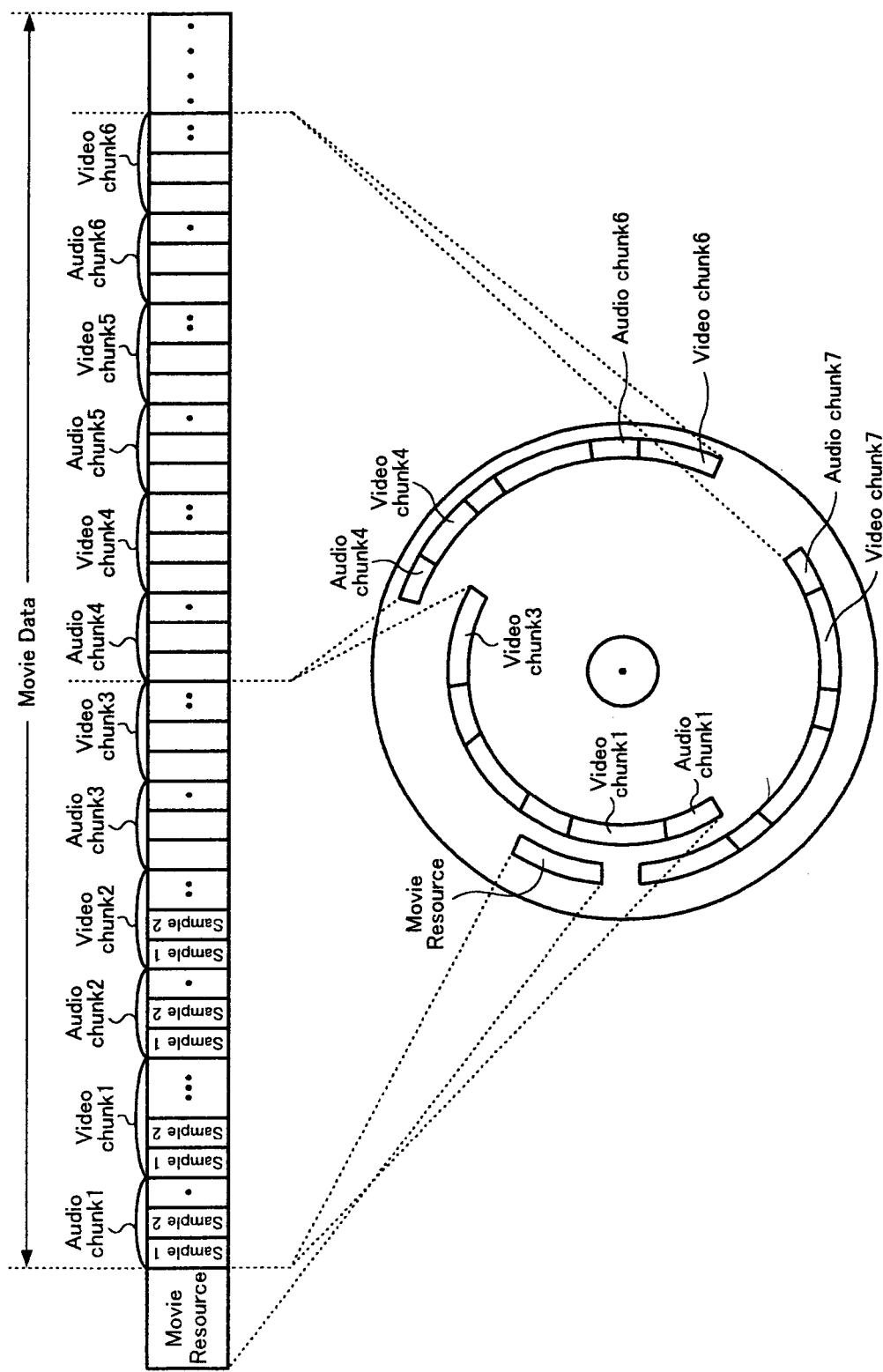
FIG. 10 is a schematic diagram for explaining an example of a recording method for an optical disc according to the embodiment of the present invention.

When video chunks and audio chunks are multiplexed, a plurality of sets of video chunks and audio chunks are matched with the successive record length in such a manner that each video chunk adjacents to each audio chunk corresponding thereto. For example, as shown in FIG. 10, data for three seconds of which three sets of video chunk #i for one second as shown in FIG. 5B and audio chunk #i for one second as shown in FIG. 6B are matched with the successive record length on the optical disc. For example, data for three seconds of an audio chunk #1, a video chunk #1, . . . , an audio chunk #3, and a video chunk #3 are recorded corresponding to one successive record length.

As shown in FIG. 10, the position of the successive record length is physically not continuous. Thus, after the movie resource is reproduced, when the first audio chunk and video chunk are reproduced (namely, data of two successive record lengths is reproduced), a track jump takes place. However, as was described above, since the data transfer rate of write/read operation is higher (for example, two times higher) than the data transfer rate of a QuickTime movie file, even if data is intermittently read, successive QuickTime movie files can be reproduced.

Thus, the transfer rate of a QuickTime movie file, the read rate of data from the optical disc, the duration of the successive record length, and the seek time of the disc drive (the seek time is the duration necessary for a track jump from one track to another track) mutually relate. Thus, the duration of video data and audio data recorded in the successive record length can be selected in various manners from other than 3 seconds. It is preferred that in the duration for video frames of video data recorded in the successive record length, an integer number of audio samples are placed.

According to the above-described embodiment, only video data or audio data can be recorded to an optical disc. In addition, video data and audio data can be multiplexed and recorded to an optical disc. Moreover, as a successive record length, one or a plurality of chunks can be contained. Thus, according to the embodiment, information that represents in what units audio chunks and video chunks are contained as a successive record length on the optical disc is placed in the movie resource portion (management information portion) of the QuickTime movie file. In other words, with reference to information of the management data portion of the file, data that is successively recorded on the audio track and video track can be obtained. Such information is for example information that represents the relation of tracks on which data is successively recorded and information that represents the number of chunks (or sets) contained in the successive record length.

In reality, such information is described in the sample description 57 (see FIGS. 2 and 4) of the movie resource portion of the QuickTime movie file. FIG. 11 shows the general structure of the QuickTime movie file composed of two tracks of a video track and an audio track. The sample description 57 may contain CODEC (compression-decompression method) and its attributes as information necessary for interpreting sample data.

FIG. 12 shows the structure of the sample description 57 in detail. According to the embodiment of the present invention, the sample description 57 contains seven fields defined as shown in FIG. 12 in addition to the information storing area. The field "Data format" contains information for identifying a format type such as a compression method for audio data and video data. In this example, when video data corresponding to MPEG2 and audio data corresponding to MPEG audio player 2 are recorded, the field "Data format" contains a character string DMPEG as an example of the format type.

As with the basic structure unit of the movie resource of the QuickTime movie file, the extended seven fields are defined as a set of "size" that represents the extended portion, "type" that represents the extended contents, and "data" that represents the extended data in succession.

In reality, in the example, the field "Extension size" of four bytes contains the size of all the extended seven fields (the number of bytes) so as to represent the extended portion. The next field "Extension type" of four bytes contains a character string—for example "stde"—as the type name that represents the extended contents. In other words, the type name (stde) represents information about tracks on which chunks are successively recorded on the disc as extensively defined data. As the information, five fields (Flags, Track ID, Data reference index, Recorded data size, and Repeat number) are defined as follows.

The field "Flags" of one byte contains an information flag about an interpreting method of data placed in the fields "Track ID", "Data reference index", "Recorded data size", and "Repeat number". The field "Track ID" of four bytes, the field "Data reference index" of two bytes, the field "Recorded data size" of two bytes, and the field "Repeat number" of one byte complexly contain information that represents in what units chunks of an audio track and a video track have been interleaved and successively recorded.

The field "Flags" represents whether chunks of different tracks have been interleaved and successively written on the disc (when the value of the field "Flags" is 4) or not (when the value of the field "Flags" is 1).

The field "Track ID" represents an identification value of an index of a track. The identification value is contained in the track header 42 shown in FIGS. 2 and 3. The value of the field "Track ID" is unique in one movie file. The field "Track ID" defines a track on which chunks are successively written.

The field "Data reference index" represents an identification value assigned to each sample description table that contains detailed information of a sample in the sample description 57 (see FIG. 11) of the track. Normally, one sample description contains one sample description table. However, after a movie file is edited, one sample description may contain a plurality of sample description tables. The value of the field "Data reference index" is unique on one track. The field "Data reference table" defines a chunk that is successively written and composed of a sample containing sample information described in a sample description table.

The field "Recorded data size" represents the minimum number of chunks that are successively recorded on the disc as chunks on one track designated by the field "Track ID" and the field "Data reference index".

The field "Repeat number" represents the number of times of which a set of chunks successively recorded on a track designated by the fields "Track ID", "Data reference index", and "Recorded data size" is repeated.

In a combination of the five data fields, information of what chunks of what track have been successively recorded as a set on a disc in what order and in what unit is represented.

Next, examples of combinations of the five data fields will be described. For simplicity, a movie file having one audio track and one video track and a movie file having only one audio track are assumed.

Figure 13A:
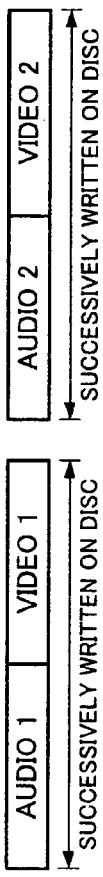
FIGS. 13A, 13B, 13C, 13D, 13E, 13F, and 13G are schematic diagrams for explaining several examples of a chunk flag and chunk numbers according to the embodiment of the present invention.

FIG. 13A shows a first example. In the first example, there are one audio track (Track ID=1) and one video track (Track ID=2). Audio chunks (Data reference index=1) and video chunks (Data reference index=1) are alternately and successively written on a disc. Each audio chunk is followed by each video chunk. In this example, on the audio track, values of which Flags=4, track ID=2, Data reference index=1, Recorded data size=1, and Repeat number=1 are stored; on the video track, values of which Flags=4, Track ID=0, Data reference index=0, Recorded data size=1, and Repeat number=1 are stored.

In this example, since the two tracks are interleaved and arranged, the values of the field "Flags" on both the tracks are 4 that represents an interleave format.

Since an audio chunk is followed by a video chunk corresponding thereto as a set, the values of Track ID=2 and Data reference index=1 of the video track are assigned to the field "Track ID" and the field "Data reference index" of the audio track, respectively, so as to represent the dependant relation of a video chunk connected to an audio chunk.

In contrast, a value 0 that represents that no chunk is connected is assigned to the field "Track ID" and the field "Data reference index" of the video track so as to represent no chunk successively written.

As the number of chunks of audio data and video data that are successively written, a value 1 that represents one chunk is assigned to the field "Record data size" of the audio track and the video track. In addition, as the number of repeating times, a value 1 is assigned to the field "Repeat number" of the audio track and the video track.

Figure 13B:
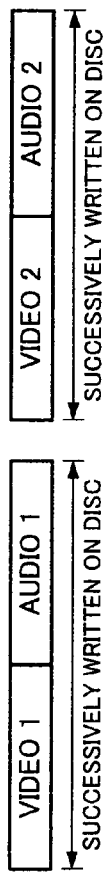

FIG. 13B shows a second example. In the second example, there are one audio track (Track ID=1) and one video track (Track ID=2). Audio chunks (Data reference index=1) and video chunks (Data reference index=1) are alternately and successively written on a disc. Each audio chunk is followed by each video chunk. In this example, on the audio track, values of which Flags=4, track ID=2, Data reference index=0, Recorded data size=1, and Repeat number=1 are stored; on the video track, values of which Flags=4, Track ID=1, Data reference index=1, Recorded data size=1, and Repeat number=1 are stored.

Figure 13C:
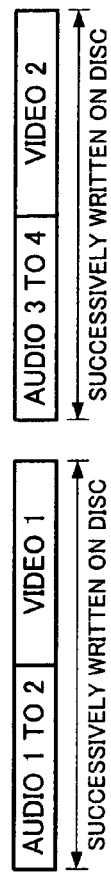

FIG. 13C shows a third example. In the third example, there are one audio track (Track ID=1) and one video track (Track ID=2). Audio chunks (Data reference index=1) and video chunks (Data reference index=1) are alternately and successively written on a disc in such a manner that two audio chunks are followed by one video chunk. In this example, on the audio track, values of which Flags=4, track ID=2, Data reference index=1, Recorded data size=2, and Repeat number=1 are stored; on the video track, values of which Flags=4, Track ID=0, Data reference index=0, Recorded data size=1, and Repeat number=1 are stored.

Figure 13D:
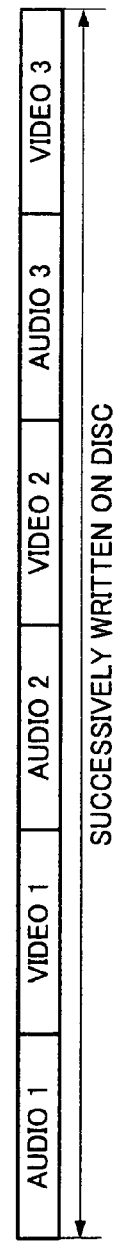

FIG. 13D shows a fourth example. In the fourth example, there are one audio track (Track ID=1) and one video track (Track ID=2). Audio chunks (Data reference index=1) and video chunks (Data reference index=1) are alternately and successively written on a disc in such a manner that three sets of one audio chunk and one video chunk are successively written as one unit. In this example, on the audio track, values of which Flags=4, track ID=2, Data reference index=1, Recorded data size=1, and Repeat number=3 are stored; on the video track, values of which Flags=4, Track ID=0, Data reference index=0, Recorded data size=1, and Repeat number=3 are stored.

Figure 13E:
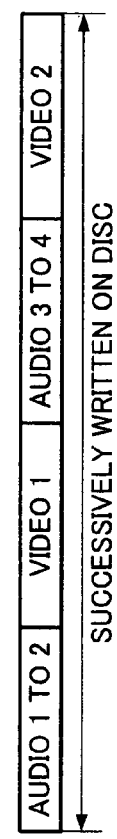

FIG. 13E shows a fifth example. In the fifth example, there are one audio track (Track ID=1) and one video track (Track ID=2). Audio chunks (Data reference index=1) and video chunks (Data reference index=1) are alternately and successively written on a disc in such a manner that two sets of two audio chunks and one video chunk are successively written as one unit. In this example, on the audio track, values of which Flags=4, track ID=2, Data reference index=1, Recorded data size=2, and Repeat number=2 are stored; on the video track, values of which Flags=4, Track ID=0, Data reference index=0, Recorded data size=1, and Repeat number=2 are stored.

Figure 13F:
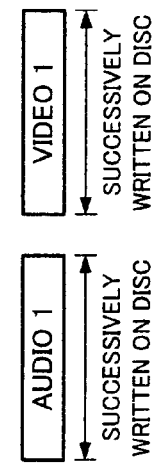

FIG. 13F shows a sixth example. In the sixth example, there is only one audio track (Track ID=1).

Audio chunks (Data reference index=1) are successively written on a disc. In this example, on the audio track, values of which Flags=0, track ID=0, Data reference index=0, Recorded data size=1, and Repeat number=1 are stored.

Figure 13G:
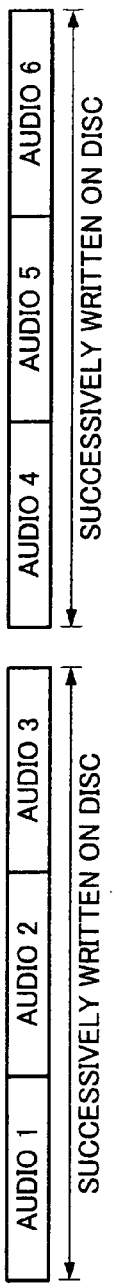

FIG. 13G shows a seventh example. In the seventh example, there is only one audio track (Track ID=1). Audio chunks (Data reference index=1) are successively written on a disc in such a manner that three audio chunks are successively written as a unit. In this example, on the audio track, values of which Flags=0, track ID=0, Data reference index=0, Recorded data size=3, and Repeat number=1 are stored.

In the above description, the present invention is applied to a disc recording and reproducing apparatus having a built-in camera.

However, it should be noted that the present invention can be applied to other apparatuses.

In addition, according to the present invention, part or all the hardware structure shown in FIG. 1 may be accomplished by software. Moreover, the software is stored in a record medium that can be read by a computer. An example of such a record medium is a CD-ROM.

In the above-mentioned embodiment, QuickTime was described. In addition, the present invention can be applied to computer software that allows a sequence of data that varies in a plurality of time sequences to be synchronously reproduced without need to use dedicated hardware.

According to the present invention, when data having a file structure is recorded to an optical disc, since the successive record length is matched with a plurality of second data units (for example, chunks of QuickTime), the accessibility and editing efficiency can be improved. In addition, according to the present invention, since information that represents the relation of a track on which chunks are successively

What is claimed is:

1. A recording apparatus for recording video data to a recording medium, said recording apparatus comprising:
    encoding means for encoding the video data in accordance with a compression-encoding process;
    converting means for converting a data structure of the encoded video data received from said encoding means into a file structure that allows a moving picture to be synchronously reproduced by computer software without a need to use specially dedicated hardware; and
    recording means for recording the data having said file structure to the recording medium;
    wherein the file structure has a first data unit and a second data unit;
    wherein a plurality of first data units and a plurality of second data units are matched with a successive record length, wherein each second data unit is adjacent to a corresponding first data unit, wherein a successive record length is a length of data that is recorded to the recording medium without a jumping operation; and reading means for reading data from a memory, wherein the data is written successively to the memory and is intermittently read when a transfer rate of the encoding means is lower than a transfer rate of the data recorded on the recording medium to prevent underflow and overflow of the recording medium.

2. A recording apparatus for recording audio data to a recording medium, said recording apparatus comprising:

encoding means for encoding the audio data in accordance with a compression-encoding process;

converting means for converting a data structure of audio data or encoded audio data into a file structure that allows a moving picture to be synchronously reproduced by computer software without a need to use specially dedicated hardware; and recording means for recording the data having said file structure to the recording medium;

wherein the file structure has a first data unit and a second data unit;

wherein a plurality of first data units and a plurality of second data units are matched with a successive record length, wherein each second data unit is adjacent to a corresponding first data unit, wherein a successive record length is a length of data that is recorded to the recording medium without a jumping operation;

reading means for reading data from a memory, wherein the data is written successively to the memory and is intermittently read when a transfer rate of the encoding means is lower than a transfer rate of the data recorded on the recording medium to prevent underflow and overflow of the recording medium.

3. A recording apparatus for recording video data and audio data to a recording medium, said recording apparatus comprising:

video encoding means for encoding the video data in accordance with a compression-encoding process in a combination of an inter-frame predictive encoding process and a motion compensating process that allow a plurality of frames to be structured as a group;

audio output means for outputting the audio data that has been either encoded or not encoded;

multiplexing means for converting a data structure of the encoded video data received from said encoding means and a data structure of the audio data received from said audio output means into respective file structures that allow a moving picture to be synchronously reproduced by computer software without a need to use specially dedicated hardware and for multiplexing the encoded video data and the audio data; and recording means for recording the multiplexed data to the recording medium;

wherein the file structure has a first data unit and a second data unit;

wherein a plurality of first data units and a plurality of second data units are matched with a successive record length, wherein each second data unit is adjacent to a corresponding first data unit, wherein a successive record length is a length of data that is recorded to the recording medium without a jumping operation;

reading means for reading data from a memory, wherein the data is written successively to the memory and is intermittently read when a transfer rate of the encoding means is lower than a transfer rate of the data recorded on the recording medium to prevent underflow and overflow of the recording medium.

4. The recording apparatus as set forth in claim 3, wherein in the multiplexed data, a duration of the encoded video data of the second data unit is almost equal to a duration of the audio data of the second data unit.

5. The recording apparatus as set forth in claim 3, wherein in the multiplexed data, the encoded video data of the second data unit and audio data of the second data unit are alternately arranged, and wherein a plurality of sets of the encoded video data of the second data unit and the audio data of the second data unit are matched with the successive record length.

6. The recording apparatus as set forth in claim 2, wherein the audio data is compression-encoded, in accordance with a Adaptive Transform Acoustic Coding method (ATRAC); and wherein the first data unit of the file structure contains one or more sound units.

7. The recording apparatus as set forth in claim 1, wherein the file structure further includes a data portion that includes management information, and wherein the data portion describes a number of the second data units contained in the successive record length.

8. The recording apparatus as set forth in claim 3, wherein the file structure further includes a data portion that includes management information, and wherein the data portion describes a flag and a number of sets contained in the successive record length, the flag representing whether or not sets of encoded video data and audio data of the second data unit have been recorded in the data portion.

9. A recording method for recording video data to a recording media, said method comprising the steps of:

encoding the video data in accordance with a compression-encoding process;

converting a data structure of the encoded video data received at the encoding step into a file structure that allows a moving picture to be synchronously reproduced by computer software without a need to use specially dedicated hardware;

recording the data having said file structure to the recording medium;

wherein the file structure has a first data unit and a second data unit; and matching a plurality of first data units and a plurality of second data units with a successive record length, wherein each second data unit is adjacent to a corresponding first data unit, wherein a successive record length is a length of data that is recorded to the recording medium without a jumping operation;

reading means for reading data from a memory, wherein the data is written successively to the memory and is intermittently read when a transfer rate of the encoding means is lower than a transfer rate of the data recorded on the recording medium to prevent underflow and overflow of the recording medium.

10. A recording method for recording audio data to a recording medium, said method comprising the steps of:

encoding the audio data in accordance with a compression-encoding process;

converting a data structure of audio data or encoded audio data into a file structure that allows a moving picture to be synchronously reproduced by computer software without a need to use specially dedicated hardware;

recording the data having said file structure to the recording medium;

wherein the file structure has a first data unit and a second data unit; and matching a plurality of first data units and a plurality of second data units with a successive record length, wherein each second data unit is adjacent to a corresponding first data unit, wherein a successive record length is a length of data that is recorded to the recording medium without a jumping operation;

reading means for reading data from a memory, wherein the data is written successively to the memory and is intermittently read when a transfer rate of the encoding means is lower than a transfer rate of the data recorded on the recording medium to prevent underflow and overflow of the recording medium.

11. A recording method for recording video data and audio data to a recording medium, said method comprising the steps of:

encoding the video data in accordance with a compression-encoding process in a combination of an inter-frame predictive encoding process and a motion compensating process that allow a plurality of frames to be structured as a group;

outputting audio data that has been compression-encoded or non-compressed either encoded or not encoded;

converting a data structure of the encoded video data received at the encoding step and a data structure of the audio data received at the outputting step into respective file structures that allow a moving picture to be synchronously reproduced by computer software without a need to use specially dedicated hardware;

multiplexing the encoded video data and the audio data;

recording the multiplexed data to the recording medium;

wherein the file structure has a first data unit and a second data unit; and matching a plurality of first data units and a plurality of second data units with a successive record length, wherein each second data unit is adjacent to a corresponding first data unit, wherein a successive record length is a length of data that is recorded to the recording medium without a jumping operation;

reading means for reading data from a memory, wherein the data is written successively to the memory and is intermittently read when a transfer rate of the encoding means is lower than a transfer rate of the data recorded on the recording medium to prevent underflow and overflow of the recording medium.

12. A computer readable medium on which a program for recording video data to a recording medium has been recorded, the program causing a computer to perform the steps of:

encoding the video data in accordance with a compression-encoding process;

converting a data structure of the encoded video data received at the encoding step into a file structure that allows a moving picture to be synchronously reproduced by computer software without a need to use specially dedicated hardware;

recording the data having said file structure to the recording medium;

wherein the file structure has a first data unit and a second data unit; and matching a plurality of first data units and a plurality of second data units with a successive record length, wherein each second data unit is adjacent to a corresponding first data unit, wherein a successive record length is a length of data that is recorded to the recording medium without a jumping operation;

reading means for reading data from a memory, wherein the data is written successively to the memory and is intermittently read when a transfer rate of the encoding means is lower than a transfer rate of the data recorded on the recording medium to prevent underflow and overflow of the recording medium.

13. A computer readable medium on which a program for recording audio data to a recording medium has been recorded, the program causing a computer to perform the steps of:

encoding the audio data in accordance with a compression-encoding process;

converting a data structure of audio data or encoded audio data into a file structure that allows a moving picture to be synchronously reproduced by computer software without a need to use specially dedicated hardware;

recording the data having said file structure to the recording medium; and wherein the file structure has a first data unit and a second data unit;

matching a plurality of first data units and a plurality of second data units with a successive record length, wherein each second data unit is adjacent to a corresponding first data unit, wherein a successive record length is a length of data that is recorded to the recording medium without a jumping operation;

reading means for reading data from a memory, wherein the data is written successively to the memory and is intermittently read when a transfer rate of the encoding means is lower than a transfer rate of the data recorded on the recording medium to prevent underflow and overflow of the recording medium.

14. A computer readable medium on which a program for recording video data and audio data to a recording medium has been recorded, the program causing a computer to perform the steps of:

encoding the video data in accordance with a compression-encoding process in a combination of an inter-frame predictive encoding process and a motion compensating process that allow a plurality of frames to be structured as a group;

outputting audio data that has been either encoded or not encoded;

converting a data structure of the encoded video data received at the encoding step and a data structure of the audio data received at the outputting step into respective file structures that allow a moving picture to be synchronously reproduced by computer software without a need to use specially dedicated hardware; and multiplexing the encoded video data and the audio data; and recording the multiplexed data to the recording medium;

wherein the file structure has a first data unit and a second data unit;

matching a plurality of first data units and a plurality of second data units with a successive record length, wherein each second data unit is adjacent to a corresponding first data unit, wherein a successive record length is a length of data that is recorded to the recording medium without a jumping operation;

reading means for reading data from a memory, wherein the data is written successively to the memory and is intermittently read when a transfer rate of the encoding means is lower than a transfer rate of the data recorded on the recording medium to prevent underflow and overflow of the recording medium.

15. The recording apparatus as set forth in claim 3, wherein the audio data is compression-encoded in accordance with a Adaptive Transform Acoustic Coding method (ATRAC); and wherein the first data unit of the file structure contains one or more sound units.

16. The recording apparatus as set forth in claim 2, wherein the file structure further includes a data portion that includes management information, and wherein the data portion describes a number of the second data units contained in the successive record length.

* * * * *